July 11, 1933.  F. C. THOMPSON  1,917,343
CHANGE SPEED TRANSMISSION
Filed June 20, 1927   3 Sheets-Sheet 2

INVENTOR
Fred C Thompson
BY
Symmestvedt & Lechner
ATTORNEYS

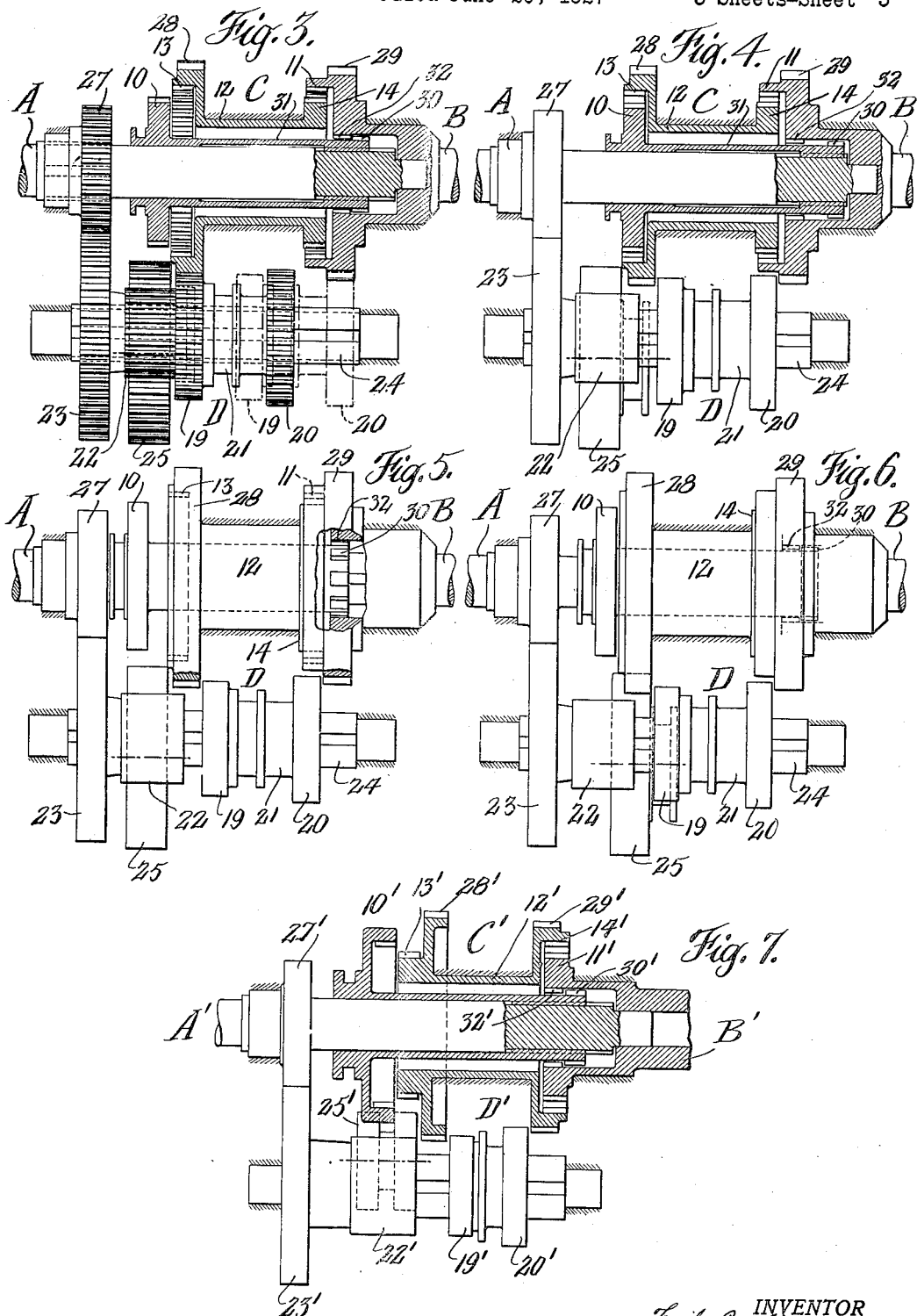

Patented July 11, 1933

1,917,343

UNITED STATES PATENT OFFICE

FRED C. THOMPSON, OF DETROIT, MICHIGAN, ASSIGNOR, BY MESNE ASSIGNMENTS, TO AUTOMOTIVE RESEARCH CORPORATION, A CORPORATION OF DELAWARE

CHANGE SPEED TRANSMISSION

Application filed June 20, 1927. Serial No. 200,061.

This invention relates to change speed transmissions for automobiles and the like.

One of the primary objects of my invention is the provision of a transmission mechanism having capacity for obtaining numerous changes of speed as between a driving shaft and a driven shaft which is simple and compact in construction and quiet in operation.

A more specific object of my invention is the provision of a change speed mechanism employing internal and external change speed gearing and selective gearing, the two being so correlated as to provide a very compact device.

Another object of my invention is the provision of an improved change speed mechanism in which overspeed drive as well as direct and reduced drive can be obtained as between the driving and driven shafts of the device.

How the foregoing, together with such other objects and advantages as may hereinafter appear, or are incident to my invention, are realized is illustrated in preferred form in the accompanying drawings, wherein—

Fig. 3 is a more or less diagrammatic view showing the device in its low or first speed position and illustrating in dot and dash lines the second speed position.

Figs. 4, 5 and 6 are diagrammatic views similar to Fig. 3 illustrating the device in its third, direct and reverse positions respectively, and Fig. 7 is a more or less diagrammatic view illustrating a modification of the invention.

Figure 1:
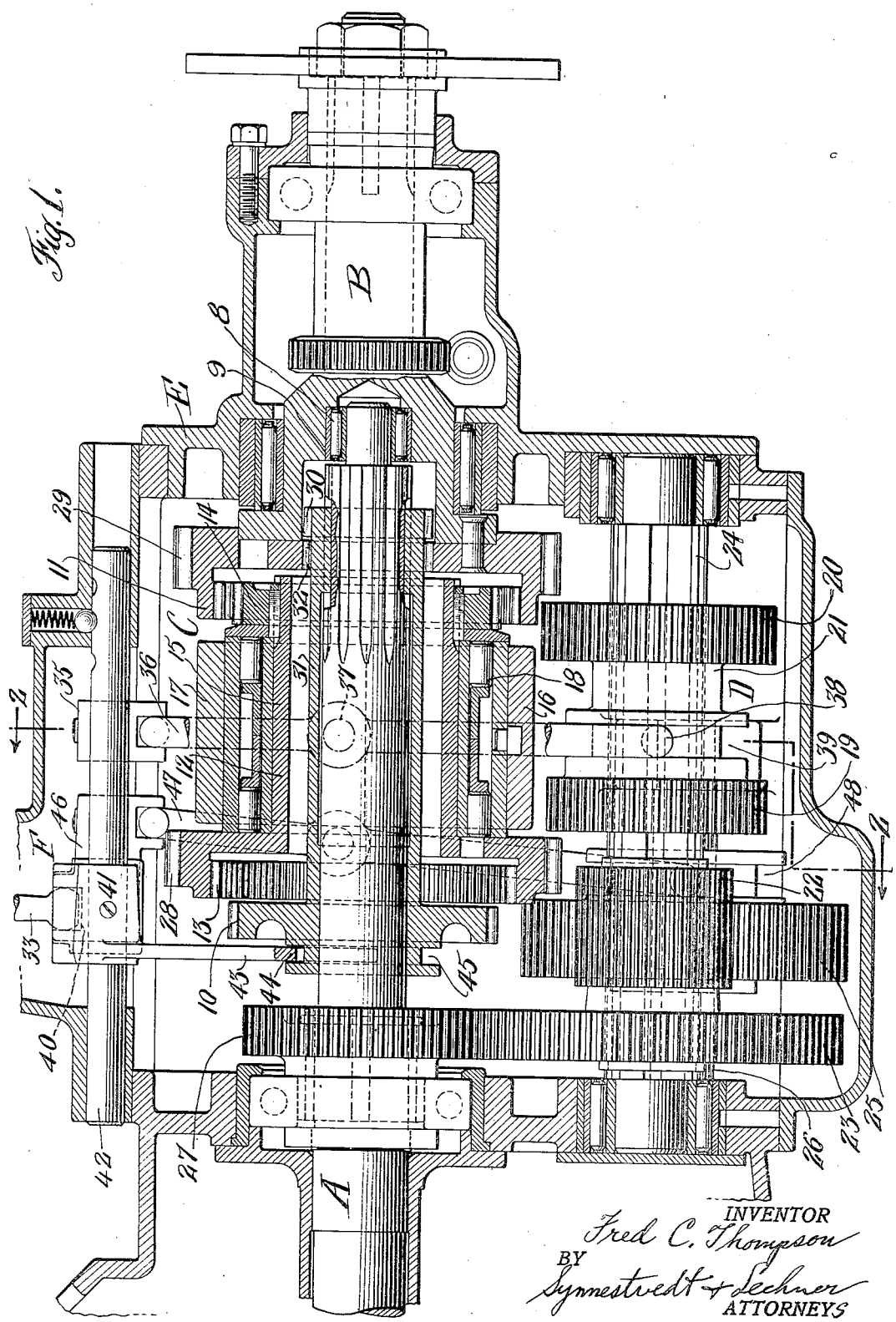
Fig. 1 is a sectional elevation through a device constructed in accordance with my invention with certain of the parts appearing in elevation, the section being taken substantially on the line 1—1 of Fig. 2.
Figure 2:
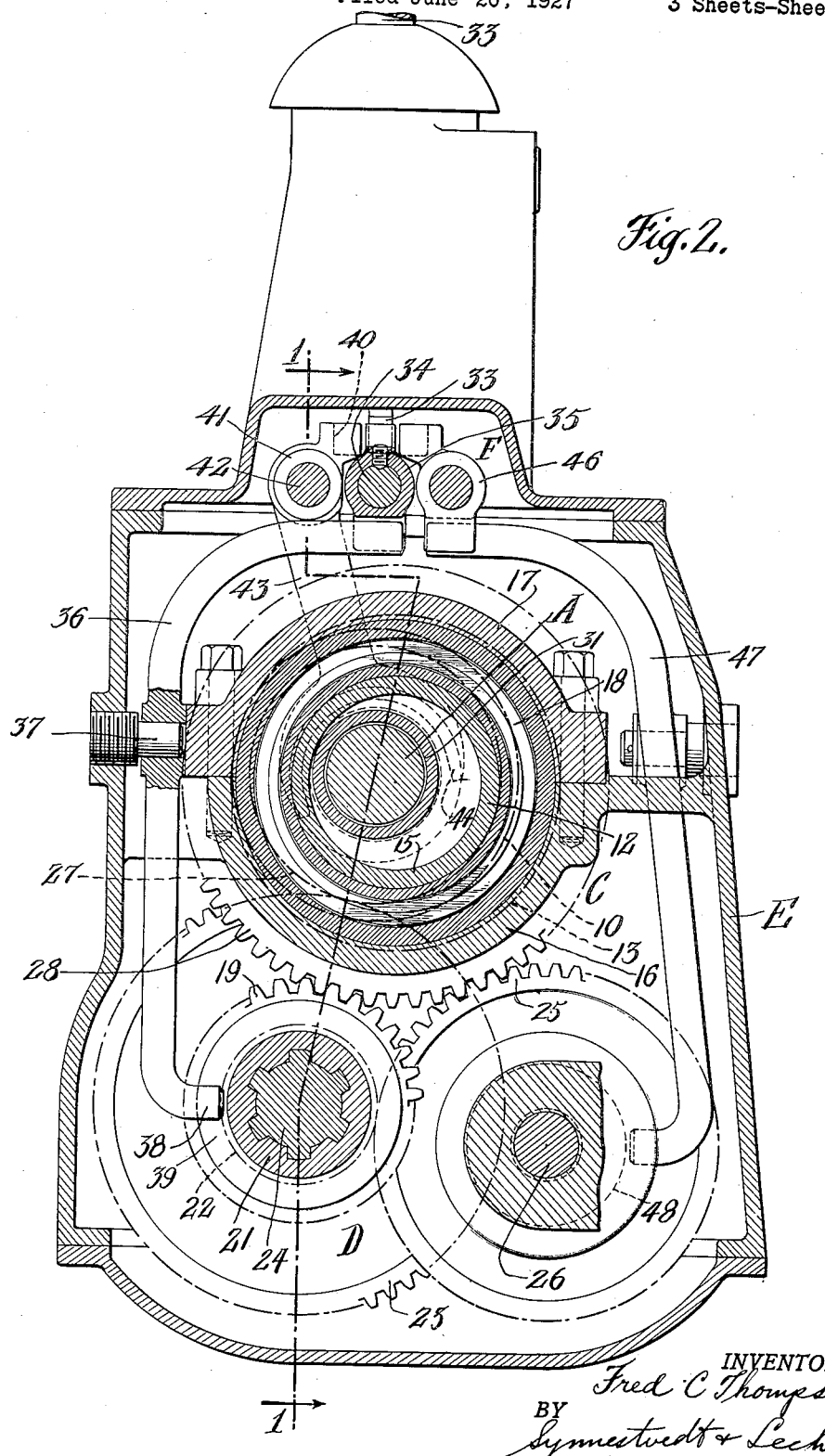
Fig. 2 is a cross section taken substantially on the line 2—2 of Fig. 1.

Referring to the drawings and more particularly to Figs. 1 and 2, the device will be described as an automobile transmission, and comprises, in general, a driving shaft A connected in any suitable manner with a source of power, in this instance the engine of an automobile; a coaxial driven shaft B connected in a suitable manner to the universal shaft of the automobile; internal-external gearing indicated, as a whole, by the reference letter C and gearing of the selective type indicated as a whole by the reference letter D, and a casing or housing E. Suitable bearings for the shafts A and B are provided in the casing E. In addition to the bearing in the casing, the shaft A is provided with a bearing 8 in the bore 9 of the shaft B.

The internal-external gearing C comprises a driving gear 10 in driving relation with the driving shaft A, that is, it rotates with the driving shaft; a coaxial driven gear 11 carried by the driven shaft B; and a compound gear 12 drivingly associated with the gears 10 and 11. In this instance the driving gear 10 is an external gear and is splined to the driving shaft so that while it rotates with the shaft, it may be moved longitudinally thereof for a purpose hereinafter appearing, and the driven gear 11 is an internal gear. The compound gear 12 comprises an internal gear 13 adapted to mesh with the external gear 10, an external gear 14 meshing with the internal gear 11, and a hollow portion 15 connecting the gears 13 and 14. The compound gear 12 is mounted in the bracket 16 of the casing E on a fixed axis offset from the axes of the shafts A and B, which bracket is provided with a cap 17 for assembly purposes, and a suitable bearing 18 is interposed between the bracket and the hollow portion of the compound gear.

The selective gearing D comprises, in this instance, a pair of selective or sliding gears 19 and 20 connected together by a hub 21, and fixed gears 22 and 23 mounted on the lay shaft 24, which shaft is provided with suitable bearings in the casing E; a sliding idler gear 25 mounted on a shaft 26 having suitable bearings in the casing and meshing with the gear 22; and a driving gear 27 carried by the drive shaft A meshing with the gear 23. The sliding gears 19, 20, and 25 are adapted to be meshed with external gears associated with the internal-external gearing above described, whereby various speed changes may be obtained other than the speed change obtainable through the medium of the gearing C, as will further appear.

In this particular instance, the external gears with which the selective gears are to be meshed are arranged as follows.

The compound gear 12 is provided with external gear teeth 28 preferably at the end having the internal gear teeth 13 and surrounding such teeth, and the driven internal gear 11 is provided with external gear teeth 29. Although the external gear teeth 28 and 29 are shown as being integrally formed on the parts mentioned, it is to be understood that they may be formed as detachable gears if desired. The relative diameters of gears 19, 20, 25, 28 and 29 and the relative disposition of the shafts A, 24 and 26, and of the bearing 15 are such as to ensure proper mesh of the gears as they are shifted to their operative positions.

The control mechanism F for effecting the various speed changes of which the device is capable and the manner of connecting the shafts A and B for direct drive will be described in connection with the operation of the device which is as follows:

The device as shown in Fig. 1 is in neutral position, that is to say, the shafts A and B are disconnected so that there is no drive as between the two shafts. It is to be noted that in such position the driving gear 10 of the internal-external gearing C is in a position to be out of mesh with its mating gear, and that the external clutch teeth 30, in this instance provided on the sleeve portion 31 projecting from the gear 10, are out of mesh with the internal clutch teeth 32 provided in the bore 9 of the shaft B. Also the gears 19, 20 and 25 are in positions to be out of mesh with their mating gears. Thus, it will be seen that there is no interconnection between the shafts A and B, either directly or through the medium of gearing.

When it is desired to obtain low or first speed drive, the control lever 33 is moved so that its lower end moves to the right, as viewed in Fig. 1, which moves the central rod 34 (see Fig. 2) to the right, carrying with it the member 35, which member is in engagement with the upper end of the pivoted arm 36. This causes the arm 36 to rock on its pivot 37 so that its lower end 38 moves to the left. The lower end 38 of the arm 36 fits into the annular groove 39 provided in the hub portion 21 of the gears 19 and 20, by virtue of which the gears 19 and 20 are moved to the left, causing the gear 19 to mesh with the external gear 28 above mentioned. During this operation the gear 10, the clutch teeth 30 and the gear 25 remain in their neutral positions. With the parts in the position just described, drive obtains as follows: The drive gear 27 meshing as it does with the lay shaft gear 23, rotates the lay shaft with its splined gear 19, which meshing as it does with the gear teeth 28 rotates the compound gear 12. This gear 12, in turn, rotates the driven shaft B through the medium of the external gear 14 and the internal gear 11. Thus, it will be seen that the reduction in speed obtained is that of the combined ratios of gears 27 and 23, 19 and 28, and 14 and 11. The relative positions of the gearing for low or first speed drive is illustrated in Fig. 3.

When it is desired to obtain the next or second speed the control lever 33 is moved so that its lower end moves to the left to its extreme left position. In this connection it is pointed out that any suitable means may be provided for limiting the movement of the lever 33 in its various operative positions. By moving the lever as just described the selective gears 19 and 20 are moved to the right, as shown in dot and dash lines in Fig. 3, which causes the gear 19 to pass out of mesh with gear 28 and effects mesh between the gears 20 and 29. With the parts in such position the reduction in speed obtained is that of the combined ratios of gears 27 and 23, and gears 20 and 29.

When it is desired to obtain the next or third speed the control lever 33 is first moved to its central position, which moves gears 19 and 20 to their neutral position, and then the control lever is moved to one side, namely, so that its lower end moves to the left as viewed in Fig. 2, which causes the lower end to enter the pocket 40 in the member 41 carried on the rod 42. This member 41 is provided with a downwardly projecting arm 43 having a fork 44 fitting the annular groove 45 provided on the driving gear 10. The lever 33 is then moved so that its lower end moves to the right, as viewed in Fig. 1, thus moving with it the member 41 and the driving gear 10 and effecting mesh between the gear 10 and the gear 13. On moving the gear 10 to the right the clutch teeth 30 move therewith still in idle position. With the parts in such position speed change as between the drive and driven shafts is obtained solely through the medium of the external-internal gearing C, the change in speed being that of the combined ratios of the gears 10 and 13, and gears 14 and 11.

For obtaining direct drive connection between the shafts A and B, the lever 33 is moved from the third speed position to its opposite extreme position which unmeshes gears 10 and 13 and causes engagement between the clutch teeth 30 and the clutch teeth 32, thus directly connecting the shafts A and B.

When it is desired to drive the driven shaft in a reverse direction, the lever 33 is moved from its central position as shown in Figs. 1 and 2, so that its lower end first moves to the right as viewed in Fig. 2 and then to the left as viewed in Fig. 1, which carries the member 46 to the left. This member 46 engages the upper end of the pivoted arm or lever 47 and causes it to rock so that its lower end moves to the right, which lower end enters the annular groove 48 in the reverse idler 25 and moves the idler 25 to the right, meshing it with the gear 28. With the parts in such position the drive is from the shaft A to the lay shaft by means of the gears 27 and 23, from the lay shaft to the compound gear 12 by means of the gear 22, idler 25 and gear teeth 28 and from the compound gear to the driven shaft by means of gears 14 and 11.

From the foregoing it will be seen that I have provided a very compact arrangement of gearing through which numerous speed changes may be obtained. By employing internal and external gears I am not only enabled to keep down the size of the device, but I also greatly reduce the noise of the device.

Referring now to Fig. 7, in which I have diagrammatically illustrated a modified form of my device, it will be seen that I have arranged the internal and external gearing in such a manner as to enable me to obtain an overspeed drive in addition to direct drive, reduced drives and reverse.

In this arrangement the driving gear 10' of the internal-external gearing C' is an internal gear and the driven gear 11' is an external gear. The compound gear 12' is provided with external gear teeth 13' adapted to mesh with the internal gear 10' and internal gear teeth 14', meshing with the external gear 11'. The compound gear 12' is also provided with external gear teeth 28' and 29' with which the sliding gears 19' and 20' are adapted to be meshed in a manner similar to that described in connection with the preferred form of the device. The reverse idler 25' is adapted to be meshed with the external gear 28'.

A brief description of the operation of this form is as follows.

For low or first speed the gear 19' is moved to mesh with gear 28' which effects reduced drive from the drive shaft A' to the driven shaft B' through the medium of gears 27', 23', 19', 28', 14' and 11'.

For second speed the gear 20' is moved to mesh with the gear 29' which effects reduced drive of somewhat less ratio from the drive shaft to the driven shaft through the medium of gears 27', 23', 20', 29', 14' and 11'.

For direct speed the clutch teeth 30' are meshed with the clutch teeth 32' and the gears run idle.

For reverse the idler gear 25' is meshed with the gear 28' which effects reverse drive as between the drive and driven shafts through the medium of gears 27', 23', 22', 25', 28', 14' and 11'.

For overspeed the driving gear 10' is meshed with the gear 13' which effects an increase in the speed of the driven shaft over that of the drive shaft through the medium of gears 10', 13', 14' and 11'.

Thus it will be seen that I am enabled to provide a very compact gear transmission having capacity for reduced speeds, direct speed, overspeed and reverse speed.

I claim:—

1. A transmission device comprising, in combination, a driving shaft, a driven shaft, a gear coaxial with the driving shaft and adapted to be rotated therewith, a gear coaxial with the driven shaft and adapted to be rotated therewith, a compound internal and external gear associated with said coaxial gears, sets of external gear teeth carried by respective separate gears of the aforesaid gearing, selective gearing adapted to be meshed with said external gear teeth and clutch means for connecting the shafts for direct drive and for permitting connection of the shafts for drive through the medium of the internal external gearing or through the medium of the selective gearing and certain of the gears of said internal external gearing.

2. A transmission device comprising, in combination, a driving shaft, a driven shaft, internal external change speed gearing, sets of external gear teeth carried by respective separate gears of the internal external change speed gearing, gearing of the selective type adapted to be meshed with said external gear teeth, and a clutch having a position for connecting said shafts for direct drive, a position permitting connection of said shafts through the medium of the internal external change speed gearing, and a position permitting connection of said shafts through the medium of said selective gearing and said external gear teeth.

3. A change speed device comprising, in combination, a driving shaft, a driven shaft, a driving gear associated with the driving shaft, a driven gear associated with the driven shaft, a compound gear associated with said driving and driven gears for obtaining change of speed as between the driving and driven shafts, a second driving gear associated with said driving shaft, selective gearing associated with said second driving gear and said driven gear for obtaining other change of speed as between the driving and driven shafts, and means for rendering the selective gearing idle when the compound gear is effective for obtaining change speed and vice versa.

4. A change speed device comprising, in combination, a driving shaft, a driven shaft, a driving gear associated with the driving shaft, a driven gear associated with the driven shaft, one of said gears being internal and the other external, a compound internal external gear associated with said gears, a second driving gear associated with said driving shaft, selective gears connected with said second driving gear for drive thereby, external gears with which said selective gears are adapted to be meshed, and means operating to connect the shafts for direct drive, for drive through the medium of the first mentioned driving gear, the compound internal external gear and the driven gear, and for drive through the medium of the second mentioned driving gear, the selective gears and the external gears.

5. A change speed device comprising, in combination, a driving shaft, a driven shaft, a driving gear, a driven gear, one of said gears being internal and the other external, a compound gear comprising internal gear teeth adapted to mesh with the external gear, and external gear teeth adapted to mesh with said internal gear and other external teeth, sliding gears connected with the drive shaft for rotation thereby, said sliding gears being adapted to be meshed with said other external teeth, and means for connecting the shafts for direct drive, for connecting the shafts for drive through the intermediary of the driving gear, the compound and the driven gears and for connecting the shafts for drive through the medium of the selective gears, the other external teeth, the compound gear and the driven gear.

6. A transmission mechanism comprising, in combination, a driving shaft, a coaxial driven shaft, a gear mounted on the driving shaft, a gear mounted on the driven shaft, one of said gears being internal and the other external, a compound gear comprising an external gear adapted to mesh with said internal gear, and an internal gear adapted to mesh with said external gear, means for connecting the shafts for direct drive and for connecting the shafts through the medium of said gearing, a plurality of sets of external gears associated with separate elements of the aforesaid gearing, selective gears adapted to be meshed with said last mentioned external gears, and means connecting said selective gears with said drive shaft for rotation thereby.

7. In a transmission mechanism, the combination of a driving shaft, a coaxial driven shaft, a gear in driving relation with the driving shaft, a coaxial driven gear, one of said gears being internal and the other external, a compound gear drivingly associated with said gears and mounted on a fixed axis offset from the axis of said gears and shafts, external gear teeth carried by certain of the aforesaid gears, sliding gears adapted to be meshed with said external gear teeth for obtaining speed changes other than direct drive and the speed change obtainable by the aforesaid gearing, drive gearing in driving relation with the driving shaft for rotating said sliding gears, and means adapted to associate the driving shaft directly with the driven shaft when in one position, and to associate the driving shaft with the driven shaft through the medium of the first mentioned gearing when in another position.

8. A transmission device comprising, in combination, a driving shaft, a driven shaft, internal and external gearing drivingly connected to the driving shaft, a gear of said gearing being movable to drivingly connect and disconnect the gearing with said drive shaft, means associated with said movable gear for connecting the driving and driven shafts for direct drive when said movable gear is disconnected from the internal and external gearing and having a position in which the shafts are disconnected entirely, other external gears carried by said internal and external gears, sliding gears adapted to be meshed with said other external gears for obtaining speed changes other than direct drive and internal external geared drive, and driving means for said sliding gears.

9. A change speed device comprising, in combination, a drive shaft, a driven shaft, a gear in driving relation with the driving shaft, a coaxial driven gear, one of said gears being external and the other internal, a compound gear drivingly associated with said gears and having internal teeth for mesh with said external gear, external teeth for mesh with said internal gear, and other external teeth, said coaxial gear having external teeth other than the teeth which cooperate with said compound gear, a lay shaft in driving relation with said drive shaft, sliding gears in driving relation with said lay shaft, said sliding gears being adapted to be meshed with said other external gear teeth, means for associating said drive and driven shafts for direct drive, and means to position the sliding gears of the lay shaft to effect speed changes thereby through the medium of said external gear teeth of the compound gear and said coaxial driven gear.

10. A change speed device comprising, in combination, a drive shaft, a driven shaft, an internal gear in driving relation with the driving shaft, a coaxial external gear, a compound gear drivingly associated with said gears, said compound gear having external teeth for mesh with said internal gear, and internal teeth for mesh with said external gear, the compound gear having other external teeth, selective gearing adapted to be meshed with said other external teeth, means connecting said selective gearing with the driving shaft for drive thereby, and means for connecting the driving and driven shafts for direct drive and through the medium of the internal-external gearing selectively.

In testimony whereof I have hereunto signed my name.

FRED C. THOMPSON.